US012571698B2

(12) United States Patent 　　　　(10) Patent No.: US 12,571,698 B2
Jung et al. 　　　　　　　　　　　　(45) Date of Patent: Mar. 10, 2026

(54) APPARATUS FOR TESTING LIQUEFIED HYDROGEN VALVE

(71) Applicant: PK Valve & Engineering CO., LTD., Changwon-si (KR)

(72) Inventors: Chang Woo Jung, Gimhae-si (KR); Ji Won Choi, Changwon-si (KR); Sang Min Kim, Changwon-si (KR); Hyung Min Jung, Gimhae-si (KR)

(73) Assignee: PK Valve & Engineering CO., LTD. (KR)

( * ) Notice: Subject to any disclaimer, the term of this patent is extended or adjusted under 35 U.S.C. 154(b) by 213 days.

(21) Appl. No.: 18/368,166

(22) Filed: Sep. 14, 2023

(65) Prior Publication Data

US 2024/0353283 A1 　　Oct. 24, 2024

(30) Foreign Application Priority Data

Apr. 21, 2023 　(KR) ......................... 10-2023-0052705

(51) Int. Cl.
　　*G01M 3/28* 　　　(2006.01)
(52) U.S. Cl.
　　CPC ................................. *G01M 3/2876* (2013.01)
(58) Field of Classification Search
　　CPC .................................................... G01M 3/2876
　　See application file for complete search history.

(56) References Cited

FOREIGN PATENT DOCUMENTS

KR 　　20080056570 A 　* 　6/2008 ......... F16K 37/0075
KR 　　100929580 B1 　11/2009
(Continued)

OTHER PUBLICATIONS

Machine translation of KR 101718631 B1 (Year: 2017).*
Machine translation of KR 20080056570 A (Year: 2008).*
Machine translation of KR 20210001692 A (Year: 2021).*

*Primary Examiner* — Nathaniel J Kolb

(74) *Attorney, Agent, or Firm* — Park & Associates IP Law Office

(57) ABSTRACT

Disclosed herein is an apparatus for testing liquefied hydrogen valve that can configure the test valve to environmental conditions of a temperature below 20K by using only low-cost helium gas without using liquefied hydrogen or liquid helium as the test fluid. This helps companies developing liquefied hydrogen valves to safely and conveniently perform valve leakage and performance tests. In accordance with the present invention, the apparatus for testing liquefied hydrogen valve includes a test vessel in which a valve body of a test valve is inserted into a vacuum-exhausted inside and sealed with a vessel cover so that an operating part of the test valve protrudes to an outside; an inlet pipe, one end of which is connected to an inlet port of the valve body; an outlet pipe, one end of which is connected to an outlet port of the valve body; a helium tank connected to the other end of the inlet pipe to supply helium gas to the inlet port of the valve body; a cryogenic refrigerator in which a cold head part that cools to a temperature below 20K is inserted into the test vessel, and a gas compression part that suctions, compresses and discharges a refrigerant gas is sealed so that it protrudes out of the vessel cover; a heat conductor, one end of which is coupled to the cold head part of the cryogenic refrigerator and the other end of which is coupled to the valve body of the test valve, and which cools the valve body of the test valve to a temperature below 20K; and a pressure sensor and a flow sensor installed on the inlet pipe and the outlet pipe to measure pressure and flow rate, respectively.

5 Claims, 5 Drawing Sheets

(56)     References Cited

FOREIGN PATENT DOCUMENTS

KR            100929802  B1     11/2009
KR            101718631  B1  *    4/2017    .......... G01M 3/2876
KR            102172696  B1     10/2020
KR         20210001692  A   *    1/2021    .......... G01M 13/003
KR        1020210001692  A       1/2021
KR            102509774  B1      3/2023

* cited by examiner

APPARATUS FOR TESTING LIQUEFIED HYDROGEN VALVE

REFERENCE TO RELATED APPLICATIONS

This application claims the priority benefit of Korean Patent Application No. 10-2023-0052705 filed on Apr. 21, 2023, the entire contents of which are incorporated herein by reference.

FIELD OF THE INVENTION

The present invention relates to an apparatus for testing liquefied hydrogen valve that can perform a leakage and performance test of a liquefied hydrogen valve under cryogenic environmental conditions of a temperature below 20K (Kelvin).

BACKGROUND OF THE INVENTION

In general, liquefied gas refers to a state in which gas is cooled or compressed to become a liquid. These liquefied gases include gases that become liquid by compressing gas at room temperature, and gases that are liquefied by cooling and pressurizing below a critical temperature rather than room temperature.

Among these, cryogenic liquefied gases include natural gas (LNG), nitrogen (N2), helium (He), and hydrogen (H2). Since each of these is stored and transported in a cryogenic state, specialized storage tanks and valves are required to ensure stable operation even in a cryogenic liquefied state and a high-pressure gas state.

Specifically, assuming that 0° C. is an absolute temperature of 273.15K, liquefied natural gas is stored and transported in a liquefied state below 122K, liquefied nitrogen below 77K, liquefied hydrogen below 20K, and liquefied helium below 4.2K.

Therefore, A valve that operates under conditions of normal pressure and room temperature for general use cannot be used for a valve for cryogenic liquefied gas used in combination with a storage tank for storing and transporting the cryogenic liquefied gas. This is because the handle and upper part of the valve shaft of the valve for cryogenic liquefied gas must be operable at room temperature, and the valve body and valve disc connected to the lower part of the valve shaft must be opened and closed in a high-pressure and cryogenic environment. This makes it possible to effectively control the flow of cryogenic liquefied gas.

For example, valves for cryogenic liquefied gas according to the prior art include Korean Patent Nos. 10-0929802, 10-2172696, and 10-2509774. Valves for cryogenic liquefied gas according to the above prior art were developed so that they can be stably used in cryogenic conditions. However, in extreme cryogenic conditions below 20K, such as liquefied hydrogen or liquefied helium, there are still problems due to leakage or freezing of the driving part, so the development of innovative cryogenic valves is urgently needed.

In the development process of such cryogenic valves, a test device that tests leakage and performance is inevitably required. As is widely known, there is a 'leakage test device for low temperature valves' in Registration Korean Patent No. 10-0929580. That is, as shown in FIG. 1, the test apparatus for a cryogenic valve according to the prior art includes a test vessel 20 filled with liquid nitrogen (N2) of a temperature below 77K so that a test valve 10 is immersed in the liquid nitrogen; an inlet pipe 30 connected to an inlet port 11 of the test valve 10; an outlet pipe 40 connected to an outlet port 12 of the test valve 10; a helium tank 50 connected to the inlet pipe 30 to supply helium gas to the test valve 10; and a pressure sensor P and a flow sensor F that are connected to each of the inlet pipe 30 and the outlet pipe 20 to measure pressure and flow rate, respectively.

Accordingly, the test valve 10 is immersed in the test vessel 20 filled with liquid nitrogen, and after a certain period of time, the test valve 10 is cooled to a temperature below 77K, thereby creating a cryogenic environment for testing. At this time, helium gas is supplied from the helium tank 50 to the inlet port 11 of the test valve 10 through the inlet pipe 30, and leakage is checked through each pressure sensors P and flow sensors F, and the opening and closing operation is checked by operating the driving part (not shown) of the test valve 10.

The test apparatus for a cryogenic valve according to the prior art as described above, even if the test vessel 20 is completely filled with liquid nitrogen, the price of liquid nitrogen is low and the temperature is relatively high and stable compared to liquefied hydrogen.

However, in the case of liquefied hydrogen, the temperature is extremely low, below 20K, and when a small amount of heat is transferred through conduction, convection, radiation, etc., hydrogen vaporization occurs. Hydrogen vaporized in this way forms an explosive gas mixture when combined with oxygen, so there is a problem that inspection of the liquefied hydrogen valve is impossible with the above-described inspection device.

Accordingly, only two tests are currently available to perform leakage and performance tests of liquefied hydrogen valves. The first method is to mount the test valve in a vacuum insulated vessel and directly use liquefied hydrogen of 20K or less as the test fluid, and the second method is to use liquid helium of less than 4K as the test fluid.

However, the actual method of using liquefied hydrogen below 20K as a test fluid is that the production and use of hydrogen is strictly controlled under current domestic laws (Hydrogen Act), and liquefied hydrogen can only be produced and used within the regulatory sandbox. Therefore, companies developing liquefied hydrogen valves cannot directly use liquefied hydrogen. In addition, it is possible to use liquid helium below 4K as a test fluid, but liquid helium is 100 times more expensive than gas helium, is difficult to supply due to extremely low temperatures, and has a very short storage period, accordingly making it difficult to establish a test schedule.

SUMMARY OF THE INVENTION

The purpose of the present invention, invented to solve the above problems, is to provide an apparatus for testing liquefied hydrogen valve that can configure the test valve to environmental conditions of a temperature below 20K by using only low-cost helium gas without using liquefied hydrogen or liquid helium as the test fluid. This helps companies developing liquefied hydrogen valves to safely and conveniently perform valve leakage and performance tests.

The objects of the present invention are not limited to the above-mentioned objects and other objects that have not been mentioned above will become evident to those skilled in the art from the following description.

In accordance with the present invention, the above and other objects can be accomplished by the provision of an apparatus for testing liquefied hydrogen valve, including a test vessel in which a valve body of a test valve is inserted into a vacuum-exhausted inside and sealed with a vessel cover so that an operating part of the test valve protrudes to an outside; an inlet pipe, one end of which is connected to an inlet port of the valve body; an outlet pipe, one end of which is connected to an outlet port of the valve body; a helium tank connected to the other end of the inlet pipe to supply helium gas to the inlet port of the valve body; a cryogenic refrigerator in which a cold head part that cools to a temperature below 20K is inserted into the test vessel, and a gas compression part that suctions, compresses and discharges a refrigerant gas is sealed so that it protrudes out of the vessel cover; a heat conductor, one end of which is coupled to the cold head part of the cryogenic refrigerator and the other end of which is coupled to the valve body of the test valve, and which cools the valve body of the test valve to a temperature below 20K; and a pressure sensor and a flow sensor installed on the inlet pipe and the outlet pipe to measure pressure and flow rate, respectively.

In addition, the test vessel is a double vessel in which the top of each vessel is sealed by exhausting a vacuum between an inner vessel and an outer vessel, and includes a multilayer insulation (MLI) sheet coated with silver colored aluminum surrounding an outer peripheral surface of the inner vessel.

In addition, the heat conductor may comprises a first copper block coupled to the cold head part; a second copper block coupled to the valve body; and a copper connector at both ends of which are respectively connected to the first copper block and the second copper block to conduct heat.

In addition, the copper connector is formed by stacking a plurality of flexible copper plates.

In addition, the test valve has the inlet port and the outlet port formed at a front side and a rear side of the valve body, respectively; the cryogenic refrigerator and the heat conductor are each provided as a pair; and the second copper blocks of the heat conductors are coupled to a left side and a right side of the valve body, respectively.

An apparatus for testing liquefied hydrogen valve according to the present invention has the following effects. It can configure the test valve to environmental conditions of 20K or less by using only low-cost helium gas without using liquefied hydrogen or liquid helium as the test fluid. This helps companies developing liquefied hydrogen valves to safely and conveniently perform valve leakage and performance tests.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, with reference to the accompanying drawings, preferred embodiments of an apparatus for testing liquefied hydrogen valve in accordance with the present invention will be described in detail.

Figure 1:
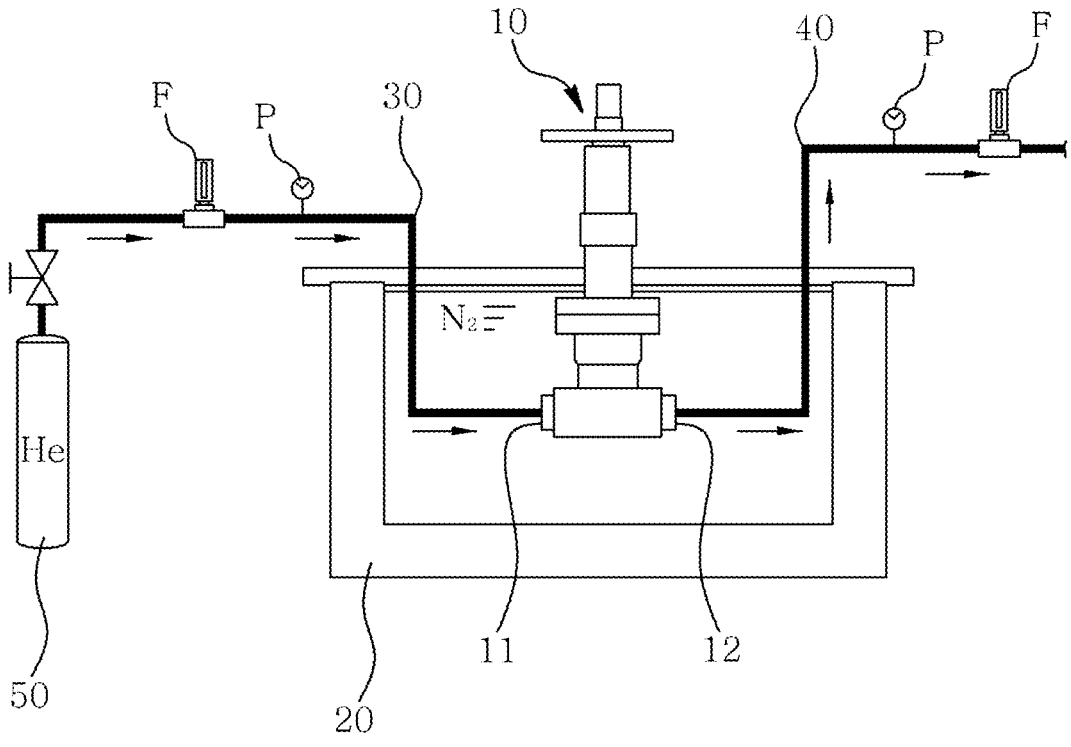
FIG. 1 is a configuration view illustrating a conventional apparatus for testing cryogenic valve.
Figure 2:
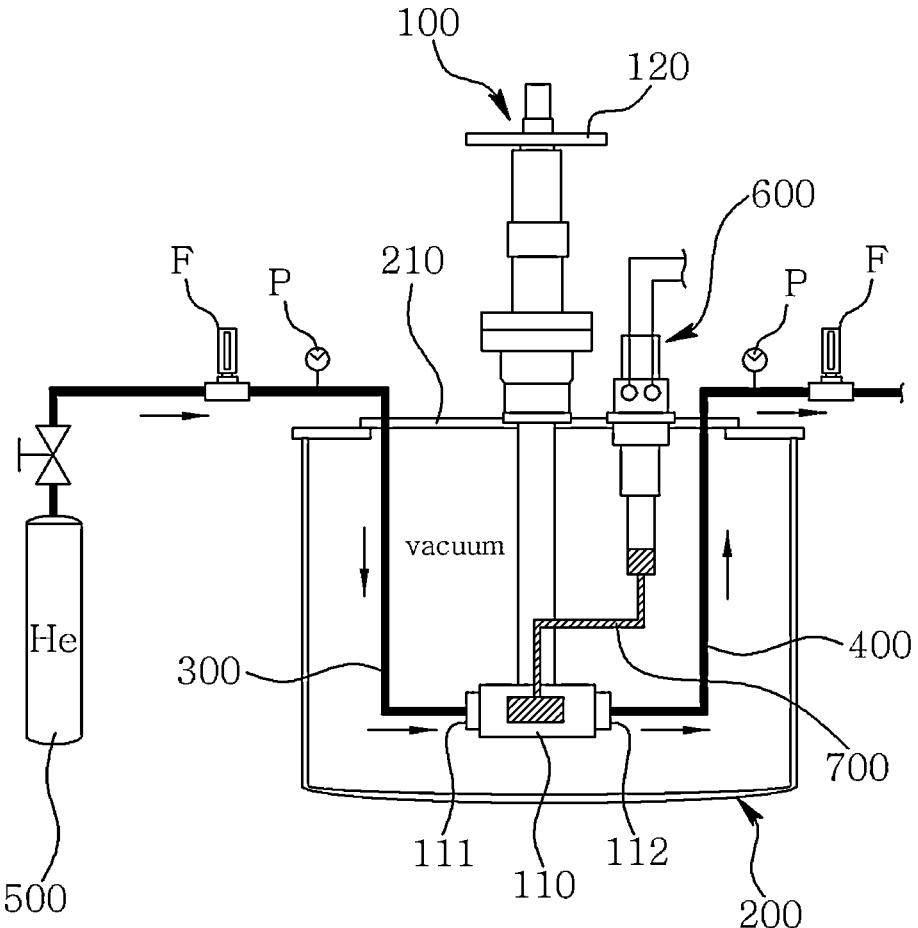
FIG. 2 is a configuration view illustrating an apparatus for testing liquefied hydrogen valve in accordance with the present invention.
Figure 3:
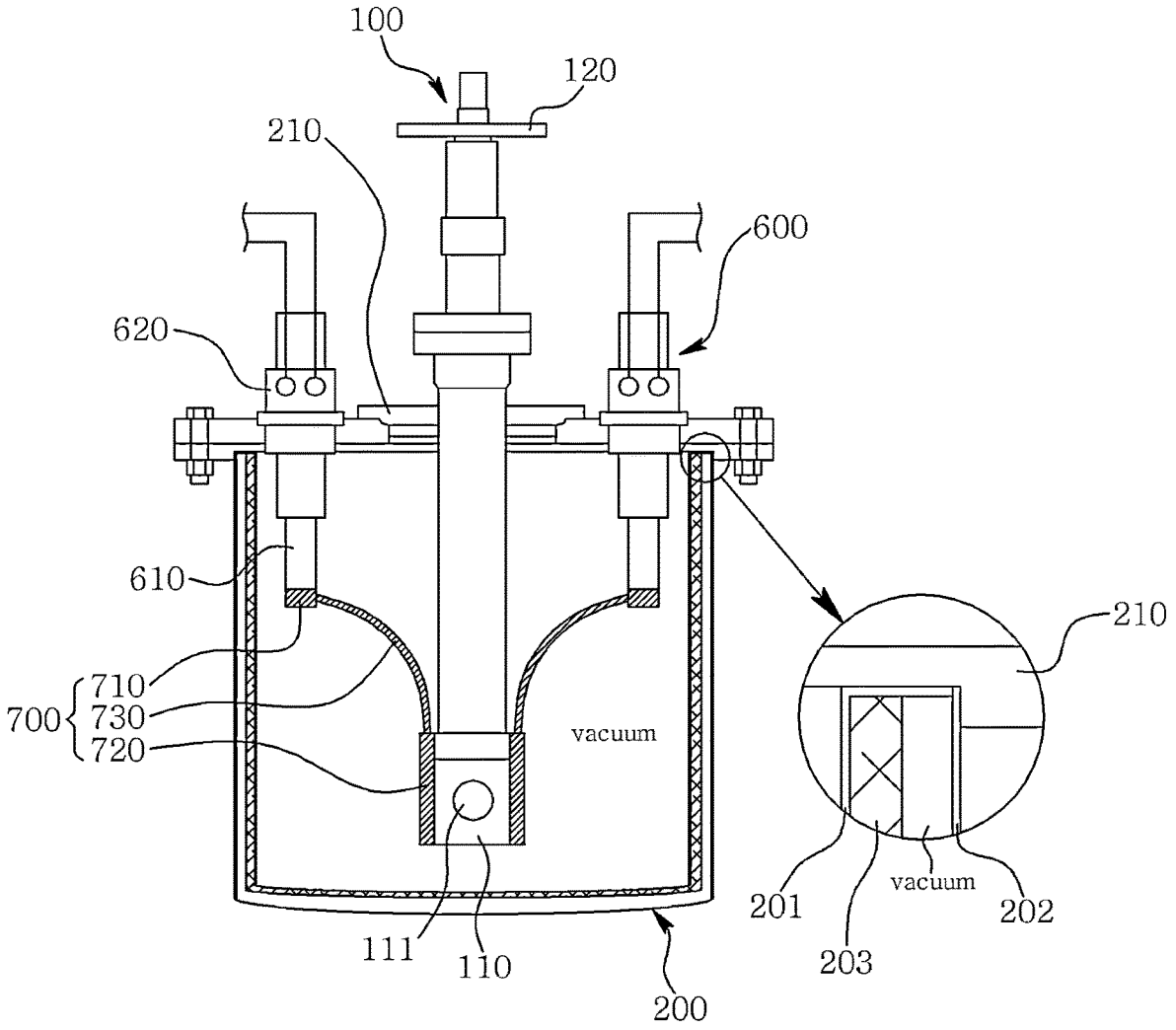
FIG. 3 is an enlarged side cross-sectional view illustrating the test vessel according to the embodiment of FIG. 2.
Figure 4:
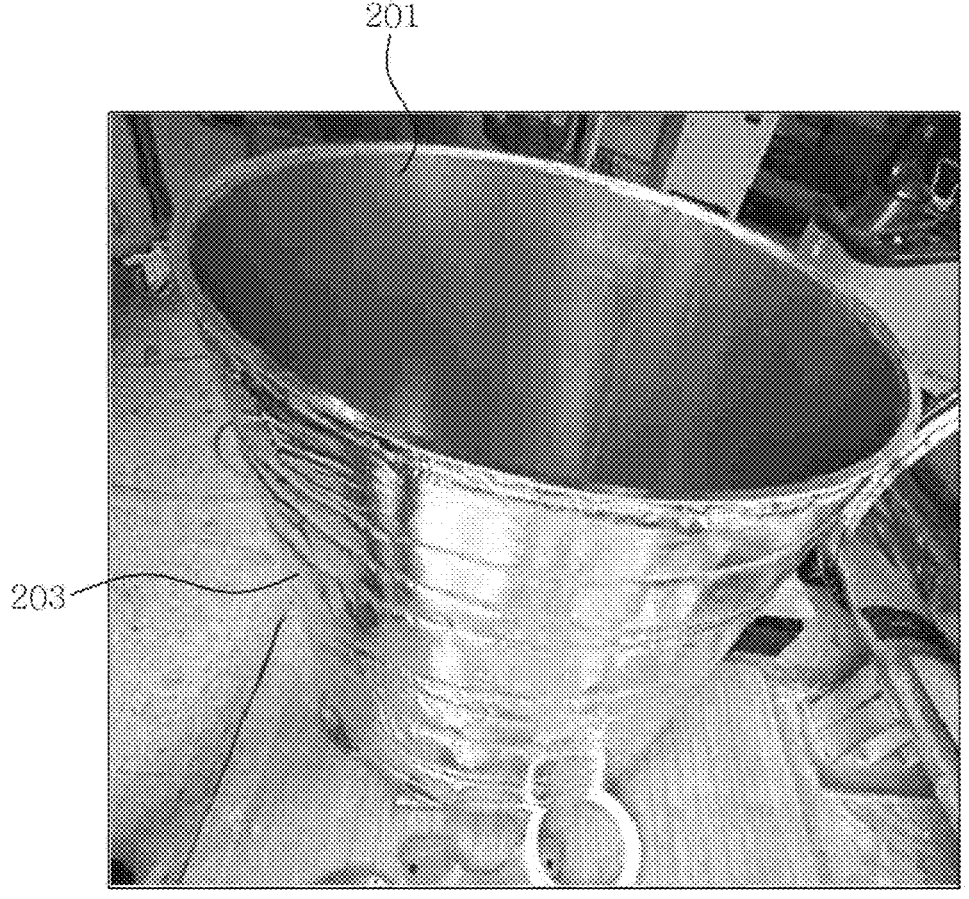
FIG. 4 is a perspective view showing an actual photograph of the multi-layer insulation sheet wrapped around the inner vessel of the test vessel according to the embodiment of FIG. 3.
Figure 5:
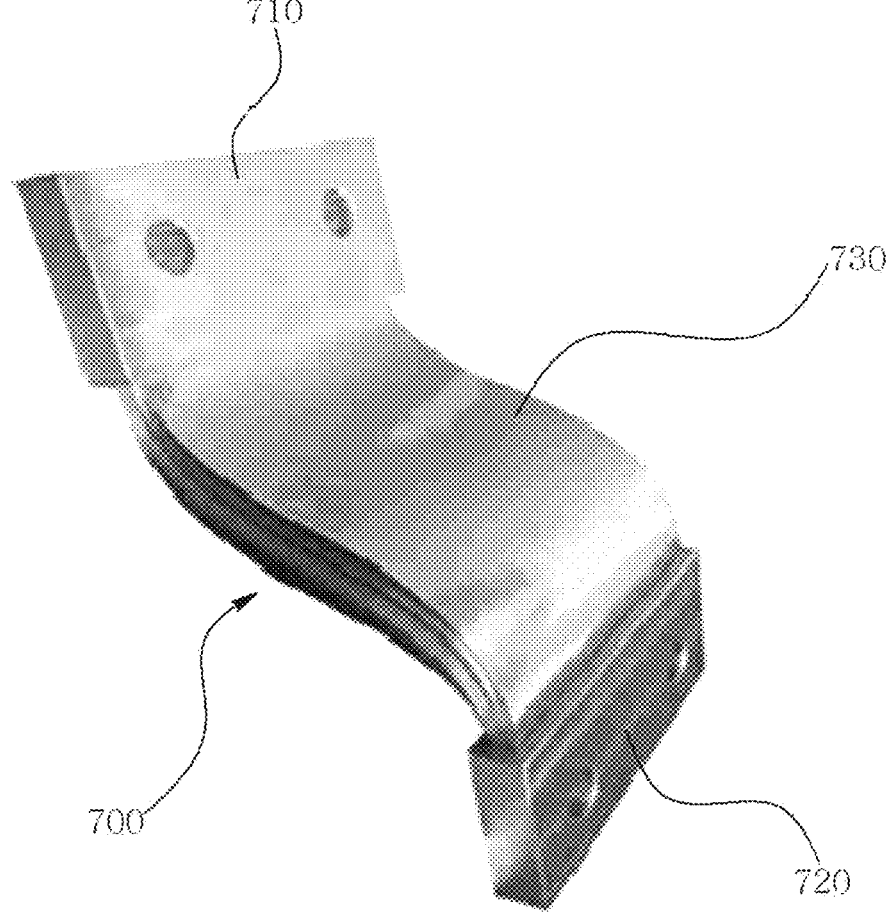
FIG. 5 is a perspective view showing an actual photograph of the heat conductor according to the embodiment of FIG. 3.

An apparatus for testing liquefied hydrogen valve in accordance with the present invention, as shown in FIGS. 2 and 3, includes a test valve 100 to test for leakage and performance, a test vessel 200, an inlet pipe 300, and an outlet pipe 400, a helium tank 500, a cryogenic refrigerator 600, and a heat conductor 700. As shown in FIGS. 3 and 4, the test vessel 200 comprises an inner vessel 201, an outer vessel 202, and a multilayer insulating sheet 230, and is sealed by a vessel cover 210. As shown in FIG. 5, the heat conductor 700 may include a first copper block 710, a second copper block 720, and a copper connector 730 which is formed by stacking a plurality of flexible copper plates.

A test valve 100, as shown in FIGS. 2 and 3, includes a valve body 110 of a lower part and an operating unit 120 of an upper part, and the valve body 110 has an inlet port 111 and an outlet port 112 is formed. The test valve 100 in the present invention is a valve for liquefied hydrogen that operates under environmental conditions of a temperature below 20K, and may be an open/close valve for opening or closing a flow path of the valve body 110, or a check valve for controlling flow in only one direction. The size of the test valve 100 may change depending on the location or flow rate to be installed. In order to perform a leakage and performance test of the test valve 100, it is inserted into a test vessel 200 to be described later.

A test vessel 200, as shown in FIGS. 2 and 3, has a vacuum-exhausted inside into which the valve body 110 of the test valve 100 is inserted, and is sealed with a vessel cover 210 so that the operating part 120 of the test valve 100 protrudes to the outside. In the case of the test valve 100, considering actual use and installation situations as a liquefied hydrogen valve, the valve body 110 must be placed in an environmental condition of a temperature below 20K, and the operating part 120 must be located at room temperature. Therefore, the valve body 110 of the test valve 100 is inserted into the test vessel 200 sealed by the vessel cover 210, and conversely, the operating part 120 of the test valve 100 is installed to protrude out of the vessel cover 210.

As shown in FIGS. 3 and 4, the test vessel 200 is a double vessel in which the upper ends of the inner vessel 201 and the outer vessel 202 are sealed by exhausting a vacuum between the inner vessel 201 and the outer vessel 202. At this time, a multi-layer insulation (MLI) sheet 203 coated with silver-colored aluminum is coupled to surround the outer peripheral surface of the inner vessel 201. That is, the test vessel 200 is a double vessel in which the multi-layer insulation sheet 203 is combined between the inner vessel 201 and the outer vessel 202, and can block radiant heat from the outside. In addition, a first vacuum is formed between the inner vessel 201 and the outer vessel 202, and a second vacuum is formed inside the inner vessel 201, thereby forming a double vacuum. Accordingly, heat convection and heat conduction due to air inside and outside the inner vessel 201 can be completely blocked.

As shown in FIG. 2, an inlet pipe 300 and an outlet pipe 400 are installed to supply and discharge the test fluid to the valve body 110 of the test valve 100, respectively. That is, one end of the inlet pipe 300 is connected to the inlet port 111 of the valve body 110, and one end of the outlet pipe 400 is connected to the outlet port 112 of the valve body 110. In other words, the inlet pipe 300 and the outlet pipe 400 correspond to transportation pipes for liquefied hydrogen when the valve for liquefied hydrogen is actually installed.

At this time, a pressure sensor P and a flow sensor F are each installed on the inlet pipe 300 and the outlet pipe 400 to measure pressure and flow rate, respectively. Therefore, leakage and performance tests can be performed by measuring the pressure and flow rate when the test fluid is supplied to the inlet pipe 300, passes through the valve body 110, and is discharged to the outlet pipe 400.

If the test valve 100 is inserted and mounted inside the test vessel 200 and the liquefied hydrogen below 20K or liquefied helium below 4.2K is supplied through the inlet pipe 300 directly, it can be the simplest way testing a liquefied hydrogen valve for leakage and performance. However, as seen in the background technology, it is impossible for companies developing a liquefied hydrogen valve to directly use liquefied hydrogen or liquefied helium as a test fluid due to problems with domestic laws and regulations and economic feasibility.

Therefore, while using low-cost helium gas as a test fluid, it is intended to provide environmental conditions of a temperature below 20K by conducting heat directly to the valve body 110 through a cryogenic refrigerator 600 and a heat conductor 700, which will be described later.

A helium tank 500, as shown in FIG. 2, is connected to the other end of the inlet pipe 300 and supplies helium gas (He) to the inlet port 111 of the valve body 110. Since helium gas is liquefied below 4.2K, it flows in a gaseous state without phase change even if the valve body 110 is placed under environmental conditions below 20K, making it most suitable as a test fluid.

This helium tank 400 may be equipped with a regulator or other on-off valve or pressure regulator.

A cryogenic refrigerator 600, as shown in FIGS. 2 and 3, has a cold head part 610 that cools to a temperature below 20K is inserted into the test vessel 200, and a gas compression part 620 that suctions, compresses and discharges a refrigerant gas is sealed so that it protrudes out of the vessel cover 210.

The cryogenic refrigerator 600 is a device that absorbs heat at extremely low temperatures and releases heat at room temperature while operating in a closed cycle. The correct technical term is 'cryogenic refrigerator', and small cryogenic refrigerators developed after the 1970s are sometimes simply referred to as 'cryocooler'. This cryogenic refrigerator 600 has application fields such as cryopump, re-condensation of evaporated gas, conduction-cooling, and subcooling of low-temperature liquid. In the present invention, the valve body 110 of the test valve 100 is cooled to a temperature below 20K through heat conduction by the heat conductor 700, which will be described later, using a conduction-cooling type.

In addition, the cryogenic refrigerator 600 can be largely divided into heat recuperative type and heat regenerative type. The heat regenerative type is easy to manufacture, has a very large heat exchange area compared to its volume, and is suitable for small-capacity refrigeration. In this case, the heat regeneration type also can be divided into Stirling, VM (Vuilleumier), GM (Gifford-McMahon), pulse tube, etc. when classified by refrigerator cycle. In the present invention, GM refrigerator, which is widely used commercially due to their high mechanical reliability, can be used.

When the cryogenic refrigerator 600 is used as a GM refrigerator, the cold head part 610 is manufactured in two stages and used for cooling the cryogenic surface. The temperature reached in the first stage is 80~100K, and the temperature reached in the second stage is 14~20K. The cooling temperature of the two-stage array, which is a cryogenic surface, is suitable for liquefied hydrogen environmental conditions of a temperature below 20K. In particular, the compressor (not shown) connected to the gas compression part 620 is desirable because it can be used as a general air conditioning compressor and has high reliability. Since the detailed configuration and operating principle of this GM refrigerator are widely known, detailed description thereof will be omitted.

A heat conductor 700, as shown in FIGS. 2 and 3, has one end coupled to the cold head part 610 of the cryogenic refrigerator 600 and the other end coupled to the valve body 110 of the test valve 100, and cools the valve body 110 of the test valve 100 to a temperature below 20K. The heat conductor 700, as its name suggests, is an object for heat conduction, and heat conduction refers to the movement of heat from an object to another object in contact with it. Therefore, both ends of the heat conductor 700 are coupled between the cold head part 610 of the cryogenic refrigerator 600 and the valve body 110 of the test valve 100, and heat conduction is conducted through the heat conductor 700, and the valve body 110 is cooled to a temperature below 20K.

This heat conductor 700 has a different thermal conductivity (W/mK) according to Fourier's law depending on the type of object. Basically, it can be divided into a thermal good conductor and a thermal bad conductor. In the present invention, the heat conductor 700 is a thermal good conductor. In other words, the thermal good conductors are mainly metals, such as silver (429 W/mK), copper (400 W/mK), gold (318 W/mK), aluminum (237 W/mK), and iron (80 W/mK). Graphene (4800-5300 W/mK) or diamond (900-2300 W/mK), which have other very high thermal conductivities, may be used as the heat conductor 700, but are not desirable because they are very expensive. Therefore, it is most desirable to use copper, which has relatively high thermal conductivity and is inexpensive compared to gold or silver, as the heat conductor 700.

The heat conductor 700, as shown in FIGS. 3 and 5, includes a first copper block 710 coupled to the cold head part 610; a second copper block 720 coupled to the valve body 110; and a copper connector 730 at both ends of which are respectively connected to the first copper block 710 and the second copper block 720 to conduct heat.

At this time, since the test valve 100 may vary in size and type, the position of the valve body 110 may also be changed up and down. Therefore, if the copper connector 730 is flexible, it will be easy to respond to changes in the vertical position of the valve body 110. Additionally, if the heat conduction efficiency from the first copper block 710 to the second copper block 720 can be increased, the cooling time of the valve body 110 can be shortened.

Accordingly, the copper connector 730, as shown in FIG. 5, is formed by stacking a plurality of flexible copper plates. The thickness of the copper plates is not limited, but it is sufficient as long as they are flexible. However, the thinner the copper plate, the larger the specific surface area per unit cross-sectional area of the conductor, and the better the heat conduction efficiency. In other words, even if it has the same length and volume, the heat conduction efficiency of a stack of thin copper plates is higher than that of a bar-shaped lump.

In addition, the inlet port 111 and outlet port 112 of the test valve 100 are formed at a front side and a rear side of the valve body 110, respectively. At this time, if both a left and right sides of the valve body 110 are cooled instead of cooling only one side, the cooling time is shortened and the cooling efficiency is further increased.

Therefore, as shown in FIG. 3, the cryogenic refrigerator 600 and the heat conductor 700 are each provided as a pair, and at this time, the second copper blocks 720 of the heat conductors 700 are coupled to a left side and a right side of the valve body 110, respectively.

As described above, the apparatus for testing liquefied hydrogen valve according to the present invention has the following effects. The present invention can configure the test valve to environmental conditions of 20K or less by using only low-cost helium gas without using liquefied hydrogen or liquid helium as the test fluid. This helps companies developing liquefied hydrogen valves to safely and conveniently perform valve leakage and performance tests.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE SYMBOLS

P: a pressure sensor
F: a flow sensor
100: a test valve
110: a valve body
111: an inlet port
112: an outlet port
120: an operating part
200: a test vessel
201: an inner vessel
202: an outer vessel
203: a multi-layer insulation (MLI) sheet
210: a vessel cover
300: an inlet pipe
400: an outlet pipe
500: a helium tank
600: a cryogenic refrigerator
610: a cold head part
620: a gas compression part
700: a heat conductor
710: a first copper block
720: a second copper block
730: a copper connector

What is claimed is:

1. An apparatus for testing a liquefied hydrogen valve, comprising:

a test vessel in which a valve body of a test valve is inserted into a vacuum-exhausted inside and sealed with a vessel cover so that an operating part of the test valve protrudes to an outside;

an inlet pipe, one end of which is connected to an inlet port of the valve body;

an outlet pipe, one end of which is connected to an outlet port of the valve body;

a helium tank connected to the other end of the inlet pipe to supply helium gas to the inlet port of the valve body;

a cryogenic refrigerator in which a cold head part that cools to a temperature below 20K is inserted into the test vessel, and a gas compression part that suctions, compresses and discharges a refrigerant gas is sealed so that it protrudes out of the vessel cover;

a heat conductor, one end of which is coupled to the cold head part of the cryogenic refrigerator and the other end of which is coupled to the valve body of the test valve, and which cools the valve body of the test valve to a temperature below 20K;

a pressure sensor and a flow sensor installed on the inlet pipe; and a second pressure sensor and a second flow sensor installed on the outlet pipe.

2. The apparatus for testing a liquefied hydrogen valve according to claim 1, wherein the test vessel is a double vessel in which the top of each vessel is sealed by exhausting a vacuum between an inner vessel and an outer vessel, and includes a multi-layer insulation (MLI) sheet coated with silver colored aluminum surrounding an outer peripheral surface of the inner vessel.

3. The apparatus for testing a liquefied hydrogen valve according to claim 1, wherein the heat conductor comprises:

a first copper block coupled to the cold head part;

a second copper block coupled to the valve body;

a copper connector connected between the first copper block and the second copper block to conduct heat.

4. The apparatus for testing a liquefied hydrogen valve according to claim 3, wherein the copper connector is formed by stacking a plurality of flexible copper plates.

5. The apparatus for testing a liquefied hydrogen valve according to claim 3, wherein the test valve has the inlet port and the outlet port formed at a front side and a rear side of the valve body, respectively;

the apparatus further comprising a second cryogenic refrigerator and a second heat conductor;

wherein the second heat conductor comprises:

a third copper block coupled to a second cold head part; and a fourth copper block coupled to the valve body; and wherein the second copper block and the fourth copper block are coupled to a left side and a right side of the valve body, respectively.

* * * * *